Figure 1:
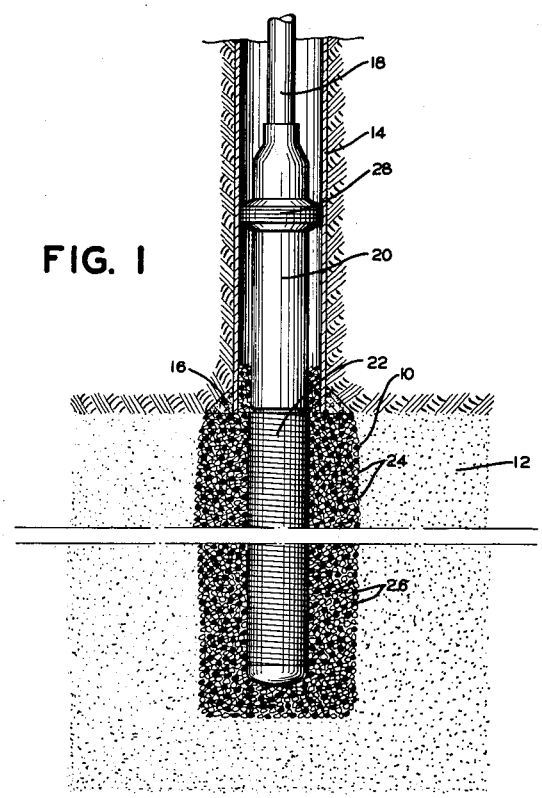

March 12, 1940.          W. M. STRATFORD          2,193,775
METHOD OF TREATING A WELL
Filed June 18, 1938

WILLIAM M. STRATFORD
INVENTOR
BY R. J. Dearborn
   Daniel Stryker
ATTORNEYS

Patented Mar. 12, 1940

2,193,775

UNITED STATES PATENT OFFICE 2,193,775

METHOD OF TREATING A WELL

William M. Stratford, New York, N. Y., assignor, by mesne assignments, to Texaco Development Corporation, New York, N. Y., a corporation of Delaware Application June 18, 1938, Serial No. 214,577

8 Claims. (Cl. 166—21)

This invention relates to that method of completing a well in which a quantity of gravel or gravel-like material is placed in the producing zone of the well, usually around a screen member attached to the lower end of a string of tubing through which tubing the oil or other liquid being produced flows to the surface. The body of gravel thus forms a filter pack which serves to support the walls of the well cavity and also to prevent sand and silt carried by the liquid from clogging up the openings in the screen.

The principal object of the invention is the provision of a gravel pack or filter pack which will not be rendered useless in the event it becomes sanded up, and which will therefore have a greater useful life than those heretofore used.

When a well is being produced as from an oil sand, a large amount of said and silt usually enters the flow string through perforations of the screen and the cutting action of the sand on the metal screen soon wears the screen away, thus leaving larger openings therein through which increasingly larger quantities of sand, silt and detritus may enter the flow string. If the screen perforations are small enough to hold back the sand, they are frequently clogged up with sand and silt, thus decreasing materially the effective area of the screen. To remedy this situation wells are frequently packed with gravel or other granular material in a manner such that a bed or pack of the subdivided material will be formed around the screen, this producing an effective filter bed through which the oil flows to the screen. The gravel holds back much of the sand and consequently a screen having larger perforations, with an attendant greater flow of oil, can be used. The gravel also serves to support the formation or walls of the well and to prevent the same from crumbling into the well cavity about the screen with an obviously detrimental effect.

In a gravel packed well fine sand or cement may in time fill most of the free spaces or channels in the gravel through which the liquid would otherwise flow to the screen. In other words, while gravel packing will greatly lengthen the life of the well there may eventually be a time when the gravel becomes sanded up to such an extent that its effectiveness may be materially lessened.

In accordance with this invention particles of a material such as a metal carbonate, preferably an alkaline earth carbonate such as limestone, are mixed with the gravel before the latter is placed in the well. After the mixture is placed in the well and the filter pack is formed, the particles of limestone will perform the same function as the gravel particles, and the sand in bridging the spaces or channels in the pack will be held back from the screen so that the oil can readily enter the screen to flow upwardly through the tubing string. In the event that the pack later becomes sanded up so that its efficiency is decreased, the pack will be treated with an acid such as an aqueous solution of hydrochloric acid which will dissolve a portion or all of the particles of limestone, thus opening up the channels in the gravel through which the liquid can again flow. Although calcium carbonate, i. e., limestone has been mentioned specifically, other metal carbonates such as magnesium carbonate, or dolomite can also ge used effectively. These materials will not be affected by water or oil and will retain their form until they are dissolved as by hydrochloric acid.

Instead of using the limestone or other material in its natural form small pellets can be prepared from finely crushed limestone, magnesium carbonate or dolomite and a binder or agglomerating agent such as sodium silicate or a casein glue, and these pellets can then be mixed with natural gravel and used in the manner described hereinbefore.

Figure 2:
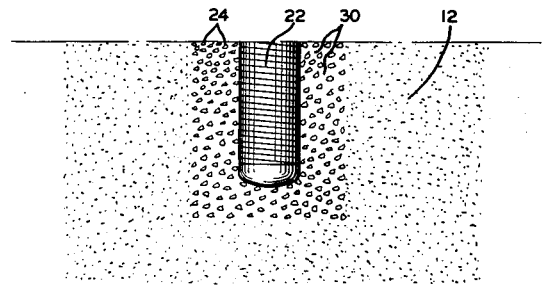

For a better understanding of the invention reference may be had to the accompanying drawing in which Figure 1 shows the producing zone of a well in which has been placed a filter pack comprising particles of gravel and particles of a material which can be subsequently dissolved out of the pack; and Figure 2 shows a portion of the well after a treatment with acid to remove the dissolvable particles.

The well is preferably provided with an enlarged cavity 10 in the producing zone 12 and is also provided with a casing 14 suitably cemented in place as at 16. A flow or tubing string 18 is suspended in the well and at the lower end of this string is disposed a liner 20 having a perforated or screen portion 22. The cavity 10 is filled with sub-divided material comprising particles of ordinary gravel 24 and particles 26 of dissolvable material such as limestone. After the sub-divided material has been placed in the cavity 10 so as to form a filter pack around the screen 22 a suitable packer 28 is positioned so as to seal the annular space between the liner 20 and the casing 14.

When it is desired to open up the pores of the filter pack the sub-divided, gravel-like material is treated with acid as has been previously described and the particles 26 of the limestone are dissolved. Figure 2 illustrates a section of the well cavity after the limestone particles have been dissolved leaving spaces 30 which were previously filled with the limestone. By opening up the pore spaces in the filter pack in this manner the oil from the formation 12 can again flow through the filter pack to the screen 22 to be conducted upwardly to the surface through the flow string 18.

Since the particles of crushed or sub-divided limestone may be angular in shape, bridging of the sand grains in the pore spaces of the gravel might not always be satisfactorily accomplished because of the irregularities in the pore spaces which would be created by the irregular character of the crushed particles. It is preferable therefore that the dissolvable particles be substantially round in shape rather than angular and to this end the particles may be rounded as by tumbling in a device such as a ball mill before being mixed with the gravel. It is also preferable, of course, that the dissolvable particles be of substantially the same size or mesh as the gravel with which they are to be mixed.

The dissolving of the particles in the gravel may cause a slight adjustment or movement of the remaining gravel and if necessary additional gravel can be placed in the well in order to make up for any shrinkage brought about in this manner.

Obviously many modifications and variations of the invention may be made without departing from the spirit and scope thereof, and therefore only such limitations should be imposed as are indicated by the appended claims.

I claim:

1. The method of completing a well with a gravel pack which comprises mixing with natural gravel a quantity of a metal carbonate, the particles of which are of substantially the same size as the particles of said gravel, placing the mixture of gravel and carbonate in the desired position in the well and then dissolving out the carbonate particles after the pore spaces and channels in the gravel pack have become clogged with sand or silt.

2. The method of completing a well which comprises mixing with a quantity of gravel a quantity of sub-divided limestone, placing the mixture of gravel and limestone in the well at the producing zone and subsequently dissolving the limestone particles by treatment with an acid so as to open up the pore spaces in the gravel pack.

3. The method of completing a well which comprises forming a quantity of artificial gravel of a material dissolvable in an aqueous solution of hydrochloric acid, mixing said artificial gravel with a quantity of natural gravel, placing the mixture in a producing zone of a well to form a filter pack and subsequently treating said filter pack with hydrochloric acid so as to dissolve the artificial gravel and open up the pore spaces in the pack.

4. The method of gravel packing a well which comprises treating finely crushed limestone with a binder so as to form pellets of a desired size, mixing said pellets with a quantity of natural gravel of substantially the same size, placing the mixture of gravel and artificial pellets in the producing zone of a well so as to form a filter pack and subsequently treating the filter pack with a solution of acid capable of dissolving the artificial pellets to open up the pore spaces and channels in the filter pack.

5. The method of graveling a well which comprises treating a quantity of particles of a crushed metal carbonate so as to round the edges of said particles, mixing the rounded particles with a quantity of natural gravel, placing the mixtures in the producing zone of a well to form a filter pack for said well, and subsequently treating the filter pack with a solution capable of dissolving the carbonate particles so as to open up the pore spaces in the pack.

6. A gravel pack for wells comprising a body of intermixed natural gravel and pebbles of spacer material, said spacer material being adapted to be dissolved from the gravel to open the gravel pack after the pack has become clogged with extraneous matter.

7. The method of gravel packing a well having a cavity in a producing formation which comprises placing in said cavity a quantity of a mixture of natural gravel and particles of dissolvable spacer material and then dissolving said spacer material to open up the pores of the gravel pack.

8. A method of opening up a gravel pack composed of natural gravel and particles of spacer material which comprises the steps of dissolving the spacer material, settling the remaining gravel pack, and adding gravel to the pack.

WILLIAM M. STRATFORD.